US012269148B2

(12) United States Patent
Oswalt

(10) Patent No.: US 12,269,148 B2
(45) Date of Patent: Apr. 8, 2025

(54) PISTON RING INSTALLATION TOOL

(71) Applicant: Cummins Inc., Columbus, IN (US)

(72) Inventor: Bradley T. Oswalt, Columbus, IN (US)

(73) Assignee: Cummins Inc., Columbus, IN (US)

( * ) Notice: Subject to any disclaimer, the term of this patent is extended or adjusted under 35 U.S.C. 154(b) by 344 days.

(21) Appl. No.: 16/995,274

(22) Filed: Aug. 17, 2020

(65) Prior Publication Data

US 2021/0046628 A1 Feb. 18, 2021

Related U.S. Application Data

(60) Provisional application No. 62/887,894, filed on Aug. 16, 2019.

(51) Int. Cl.
*B25B 27/12* (2006.01)
*F02B 75/28* (2006.01)

(52) U.S. Cl.
CPC .............. *B25B 27/12* (2013.01); *F02B 75/28* (2013.01)

(58) Field of Classification Search
CPC . B25B 27/0028; B25B 27/0035; B25B 27/12; Y10T 29/53604; Y10T 29/53609; Y10T 29/536; Y10T 29/53917
See application file for complete search history.

(56) References Cited

U.S. PATENT DOCUMENTS 1,368,655 A 2/1921 Reich
1,404,349 A * 1/1922 Despres .................. F21V 17/16 81/64
1,544,974 A * 7/1925 Gillis ...................... B25B 27/12 29/222
1,572,801 A * 2/1926 Kearney ................ B25B 27/12 29/222
1,593,220 A 7/1926 Phelps
1,767,819 A 6/1930 Solenberger
2,697,870 A * 12/1954 Zucker .................... B25B 27/12 29/222
6,318,551 B1 11/2001 Calvert
6,427,301 B1 8/2002 Foster
7,438,278 B2 * 10/2008 Wagner ..................... B25B 7/22 29/268
9,297,421 B2 3/2016 Armstrong
2021/0046628 A1 2/2021 Oswalt

FOREIGN PATENT DOCUMENTS

FR 702062 A * 3/1931
GB 245871 10/1924
GB 417879 * 10/1934
GB 637615 2/1948
GB 9141467 A * 10/1959

OTHER PUBLICATIONS

Translation of FR702062A, retrieved from Espacenet on Oct. 7, 2022 (Year: 1931).*

* cited by examiner

*Primary Examiner* — Tom Rodgers
(74) *Attorney, Agent, or Firm* — Faegre Drinker Biddle & Reath LLP

(57) ABSTRACT

Piston assembly installation tools are disclosed, each installation tool configured for installation of the piston assembly into an opposed-piston engine from a crankcase area of the engine. The installation tools comprise cutouts to account for cylinder block main journal saddles located on either side of a cylinder bore where the piston assembly may be installed.

16 Claims, 10 Drawing Sheets

PISTON RING INSTALLATION TOOL

CROSS-REFERENCE TO RELATED APPLICATIONS

This application claims priority to U.S. Provisional Application No. 62/887,894 filed on Aug. 16, 2019, the disclosure of which is hereby expressly incorporated by reference.

GOVERNMENT SUPPORT CLAUSE

This Project Agreement Holder (PAH) invention was made with U.S. Government support under Agreement No. W15QKN-14-9-1002 awarded by the U.S. Army Contracting Command-New Jersey (ACC-NJ) Contracting Activity to the National Advanced Mobility Consortium. The Government has certain rights in the invention.

FIELD OF THE DISCLOSURE

The present disclosure relates to piston ring compression tools, and, more specifically, piston ring compression tools for use in an opposed piston engine.

BACKGROUND OF THE DISCLOSURE

In conventional cylinder blocks, pistons are installed from the firedeck, or the top side of the block, which offers unrestricted access, allowing multiple styles of common compression tools to be used. Recently, however, the use of opposed-piston cylinder blocks has increased. Opposed-piston cylinder blocks utilize two pistons per cylinder, which work in opposite reciprocating action. Because of the structure of these cylinder blocks, these engines do not need cylinder heads, which provides for conservation of heat. However, these engines do not have a firedeck providing for the unrestricted access needed for the use of common compression tools. Instead, the pistons must be installed from the crankcase area of the engine.

Installation from the crankcase presents a new set of problems. Specifically, the main journals defining the cylinder bores include scallops to provide clearance for the use of a honing tool. These scallops provide for about 1 mm of clearance per side, but do not provide enough clearance for conventional tools used to install power cylinders. The scallops cannot be increased to provide clearance due to the crankshaft loads on the main bearings, and the materials used with conventional tools are too thick to fit in the cylinder bore.

Furthermore, conventional tools may require assembly of a connecting rod to a piston assembly after the piston assembly has been compressed and inserted into a corresponding cylinder block bore. Such a process increases assembly times and potentially results in extra unwanted wear on the piston rings. Otherwise, conventional tools may interfere with the cylinder block main bearing journals, which results in the inability to remove the tool over the connecting rod. As such, improvements in the foregoing are desired.

SUMMARY OF THE DISCLOSURE

Piston assembly installation tools are disclosed, each installation tool configured for installation of the piston assembly into an opposed-piston engine from a crankcase area of the engine. The installation tools comprise cutouts to account for cylinder block main journal saddles located on either side of a cylinder bore where the piston assembly may be installed.

In an illustrative embodiment, an apparatus for installing piston rings, the apparatus comprising a body comprising a sidewall with an inner surface and an outer surface, the sidewall defining an opening through the body, and at least one channel defined by the inner surface of the sidewall from a first end of the body to a second end of the body.

The apparatus may further comprise a top portion surrounding the opening and extending outwardly beyond the sidewall, the top portion defining an indention configured to selectively receive a bumper. The apparatus may further comprise a pin disposed on an upper surface of the indention, the pin configured to mate with an aperture defined by the bumper. The bumper may be at least partially comprised of rubber. The bumper may at least partially cover the channel when the bumper is received by the indention. The channel may be aligned with the indention. The channel may be configured to receive a portion of the connecting rod. The sidewall may include a first cutout portion defining a first window and a second cutout portion defining a second window, the first cutout portion and the second cutout portion each defined in a single, parallel plane and the sidewall forming an arcuate shape between the first cutout portion and the second cutout portion. The channel may be positioned between the first window and the second window. The apparatus may further comprise a second channel positioned opposite the first channel.

In another illustrative embodiment, an apparatus for installing piston rings is disclosed, the apparatus comprising a body comprising a sidewall, the sidewall defining an opening and including a first cutout portion defining a first window and a second cutout portion defining a second window, the first cutout portion defined in a first plane and the second cutout portion defined in a second plane parallel to the first plane, the sidewall forming an arcuate shape between the first cutout portion and the second cutout portion.

The apparatus may further comprise a top portion surrounding the opening and extending outwardly beyond the sidewall, the top portion defining an indention configured to selectively receive a bumper. The apparatus may further comprise a pin disposed on an upper surface of the indention, the pin configured to mate with an aperture defined by the bumper. The bumper may be at least partially comprised of rubber. The indention may be positioned between the first cutout portion and the second cutout portion. The apparatus may further comprise a second indention positioned opposite of the first indention. The apparatus may be positioned within a cylinder bore of a cylinder of an engine so that the first cutout portion is in contact with a first main journal saddle and the second cutout portion is in contact with a second main journal saddle.

In yet another illustrative embodiment, a method for installing a piston assembly is disclosed, the method including the steps of positioning an installation tool above a cylinder bore of an engine; inserting a piston and connecting rod assembly into an opening defined by the installation tool until a connecting rod of the piston and connecting rod assembly contacts a bumper removably disposed on a first end of the installation tool; exposing channels defined by an inner surface of a sidewall of the installation tool by removing the bumper from the installation tool; and lifting the installation tool out of the cylinder bore and over the connecting rod of the piston and connecting rod assembly.

The sidewall of the installation tool may define a first cutout and a second cutout so that the step of positioning the installation tool comprises positioning the installation tool between a first main journal saddle of the engine and a second main journal saddle of the engine so that the first cutout of the installation tool contacts the first main journal saddle and the second cutout of the installation tool contacts the second main journal saddle. The installation tool may include an alignment cut on a second end of the installation tool, the alignment cut configured to mate with a lip located at an opening of the cylinder bore so that the inner sidewall of the installation tool aligns with the cylinder bore.

BRIEF DESCRIPTION OF THE DRAWINGS

The above-mentioned and other features of this disclosure and the manner of obtaining them will become more apparent and the disclosure itself will be better understood by reference to the following description of embodiments of the present disclosure taken in conjunction with the accompanying drawings, wherein.

DETAILED DESCRIPTION OF THE EMBODIMENTS

The embodiments disclosed herein are not intended to be exhaustive or to limit the disclosure to the precise forms disclosed in the following detailed description. Rather, the embodiments were chosen and described so that others skilled in the art may utilize their teachings. Please note that certain terminology is used herein for convenience. For example, words such as "top," "bottom," "upper," "lower," "left," "right," "horizontal," "vertical," "upward," and "downward" merely describe the configuration shown in the figures. Components may be oriented in any direction.

Figure 1:
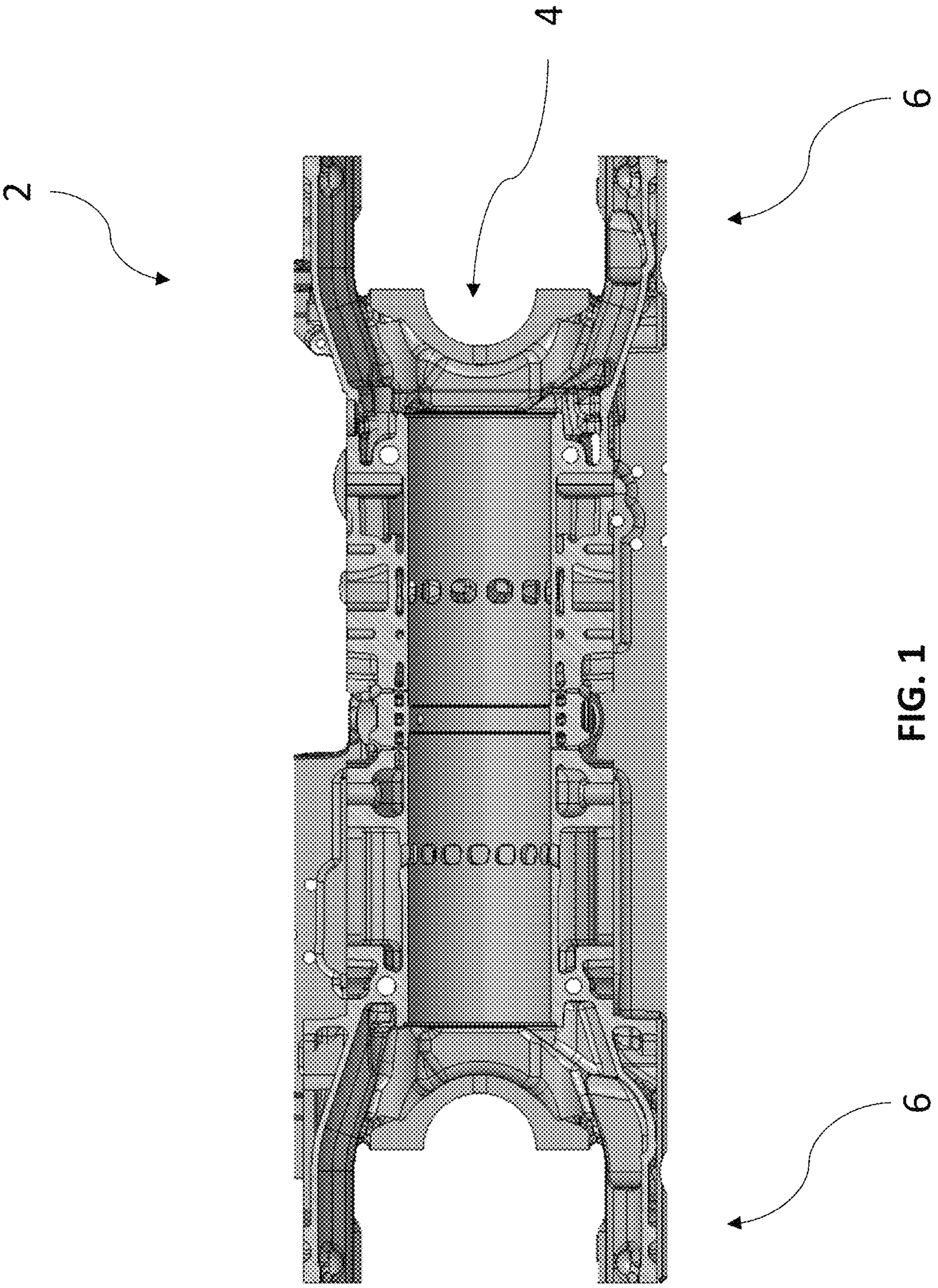
FIG. 1 is a cross-sectional view of a cylinder bore of an opposed-piston engine as may be used with the apparatus of the present disclosure.

Referring to FIG. 1, a partial cross-section of an opposed piston cylinder block 2 is shown. The opposed piston cylinder block 2 forms a plurality of cylinder bores 4 to house pistons upon assembly. For example, opposed piston cylinder blocks 2 utilize two pistons per cylinder 4, which work in opposite reciprocating action. Such cylinder blocks 2 include two crankcase areas 6 on opposing sides of the cylinder block 2 and utilize two crankshafts, which are coupled to each respective set of opposing pistons via respective connecting rods. The structure provided by such opposed piston cylinder blocks 2 eliminates the need for cylinder heads, providing for conservation of heat within the engine and allowing for greater fuel efficiency. However, the structure also eliminates the firedeck, through which pistons are conventionally installed. As a result, the pistons must be installed from the crankcase area 6 of the piston cylinder block.

Figure 2:
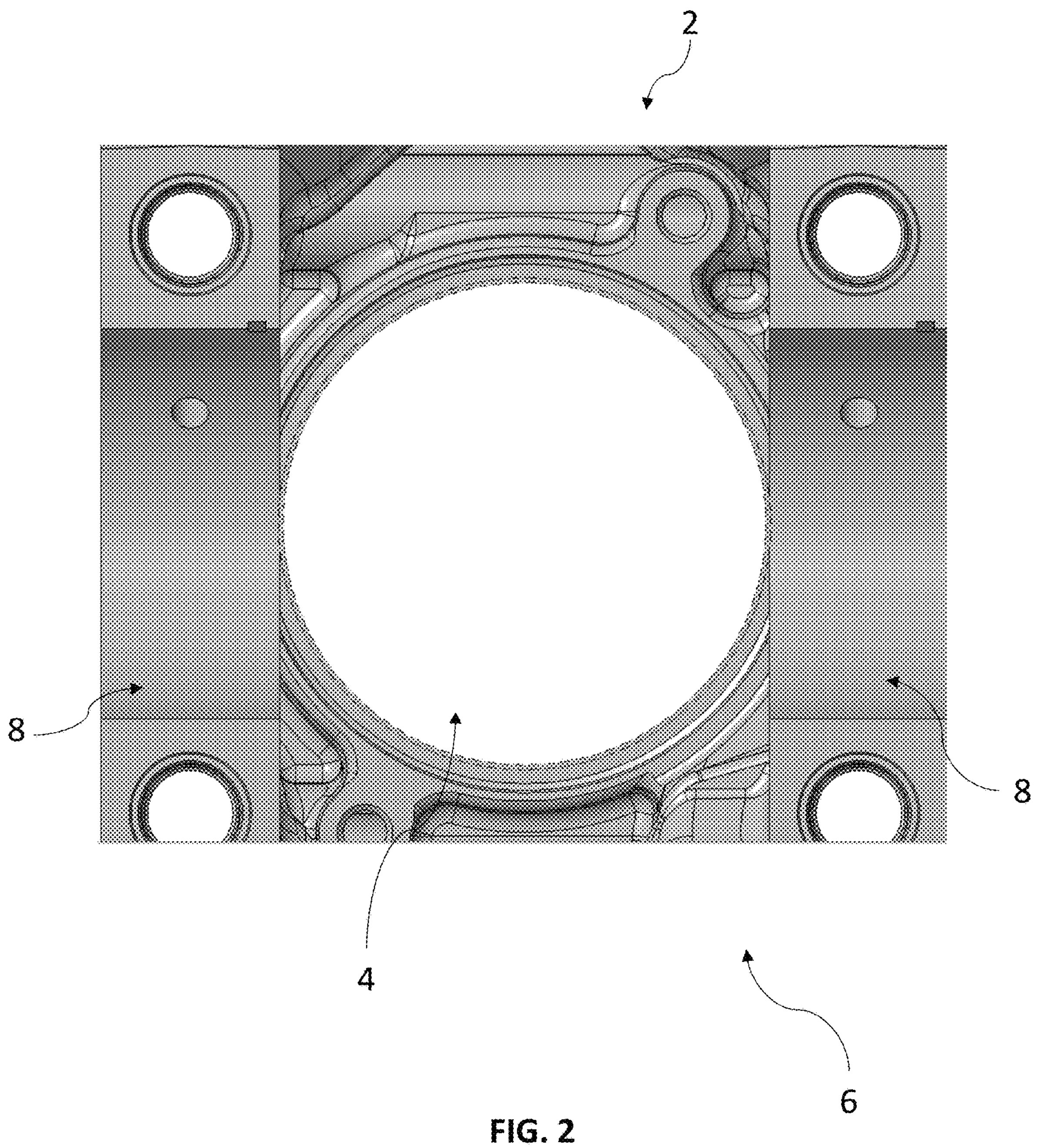
FIG. 2 is a top view of the cylinder bore of FIG. 1.

Referring to FIG. 2, a closer look at a single cylinder bore 4 from the viewpoint of the respective crankcase area 6 is shown. The crankcase areas 6 include cylinder block main journal saddles 8 positioned on either side of the cylinder bore 4 which are configured to support the crankshaft (not shown) while providing clearance for the movement of the piston and connecting rod positioned within the cylinder bore 4.

Figure 3:
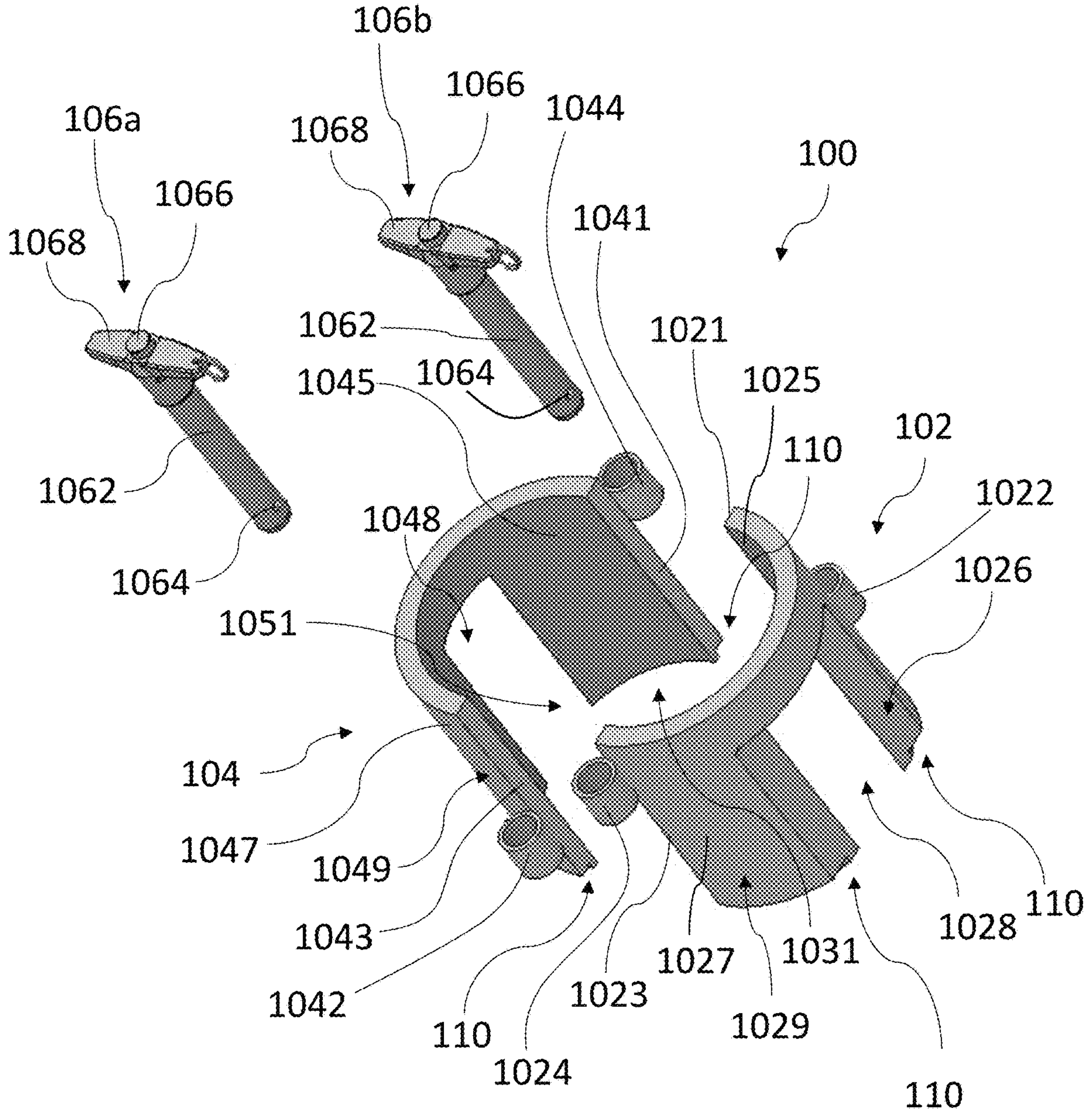
FIG. 3 is an exploded view of a piston ring compression tool of the present disclosure, including two body portions and two locking pins.

Now referring to FIG. 3, an exploded view of a compression tool 100 is disclosed. The compression tool 100 may be comprised of a variety of materials, including, but not limited to, steel, aluminum, and a variety of polymers. The compression tool 100 is comprised of at least a first body portion 102 having a wall 1029 extending between a first edge 1021 and a second edge 1023, the wall 1029 having an inner surface 1025 and an outer surface 1027, wherein a space 1031 extends between the first edge 1021 and the second edge 1023 opposite the wall 1029. The compression tool 100 further has a second body portion 104 having a wall 1049 extending between a first edge 1041 and a second edge 1043, the wall 1049 having an inner surface 1045 and an outer surface 1047, wherein a space 1051 extends between the first edge 1041 and the second edge 1043 opposite the wall 1049.

In an illustrative embodiment, the body portions 102, 104 of the compression tool 100 form a semi-circular shape to match the outer shape of a piston. In other embodiments, the body portions 102, 104 of the compression tool 100 may form any shape corresponding to approximately one-half of the outer shape of a corresponding piston. For example, the first body portion 102 is shaped and sized so that the inner surface 1025 of the wall 1029 fits snugly about the outer surface of half of a piston assembly. Likewise, the body portion 104 is shaped and sized so that the inner surface 1045 of the wall 1049 fits snugly about the outer surface of the opposite half of the piston assembly. When the first body portion 102 and the second body portion 104 are fitted about the respective halves of the piston assembly, the first edge 1021 of the first body portion 102 is configured to contact the first edge 1041 of the second body portion 104, and the second edge 1023 of the first body portion 102 is configured to contact the second edge 1043 of the second body portion 104.

The first body portion 102 includes a lower guide 1022 positioned near the first edge 1021 on the outer surface 1027 of the first body portion 102 and an upper guide 1024 positioned near the second edge 1023 on the outer surface 1025 of the first body portion 102. The second body portion 104 includes an upper guide 1044 positioned near the first edge 1041 on an outer surface 1047 of the second body portion 104 and a lower guide 1042 positioned near the second edge 1043 on the outer surface 1047 of the second body portion 104. The guides may be fixedly attached to their respective body portions via adhesive, unitary manufacturing, heat sealing, welding, or other attachment methods. In other embodiments, the guides may be removably attached to their respective body portions. Each of the guides 1022, 1042, 1024, 1044 define an aperture sized and shaped to receive a locking pin 106. In an illustrative embodiment, the locking pin 106 is comprised of a T-handle. In other embodiments, the locking pin may comprise a wire lock pin, a tab lock pin, a pull pin, a quarter turn pull pin, a ring pin, a cotter, a hitch pin, or a variety of other pins. The locking pin 106, regardless of embodiment type, must tightly fit within the guides 1022, 1042, 1024, 1044 to ensure tension is provided to the compression tool 100 to compress the piston rings of a piston located within the compression tool 100.

Figure 4:
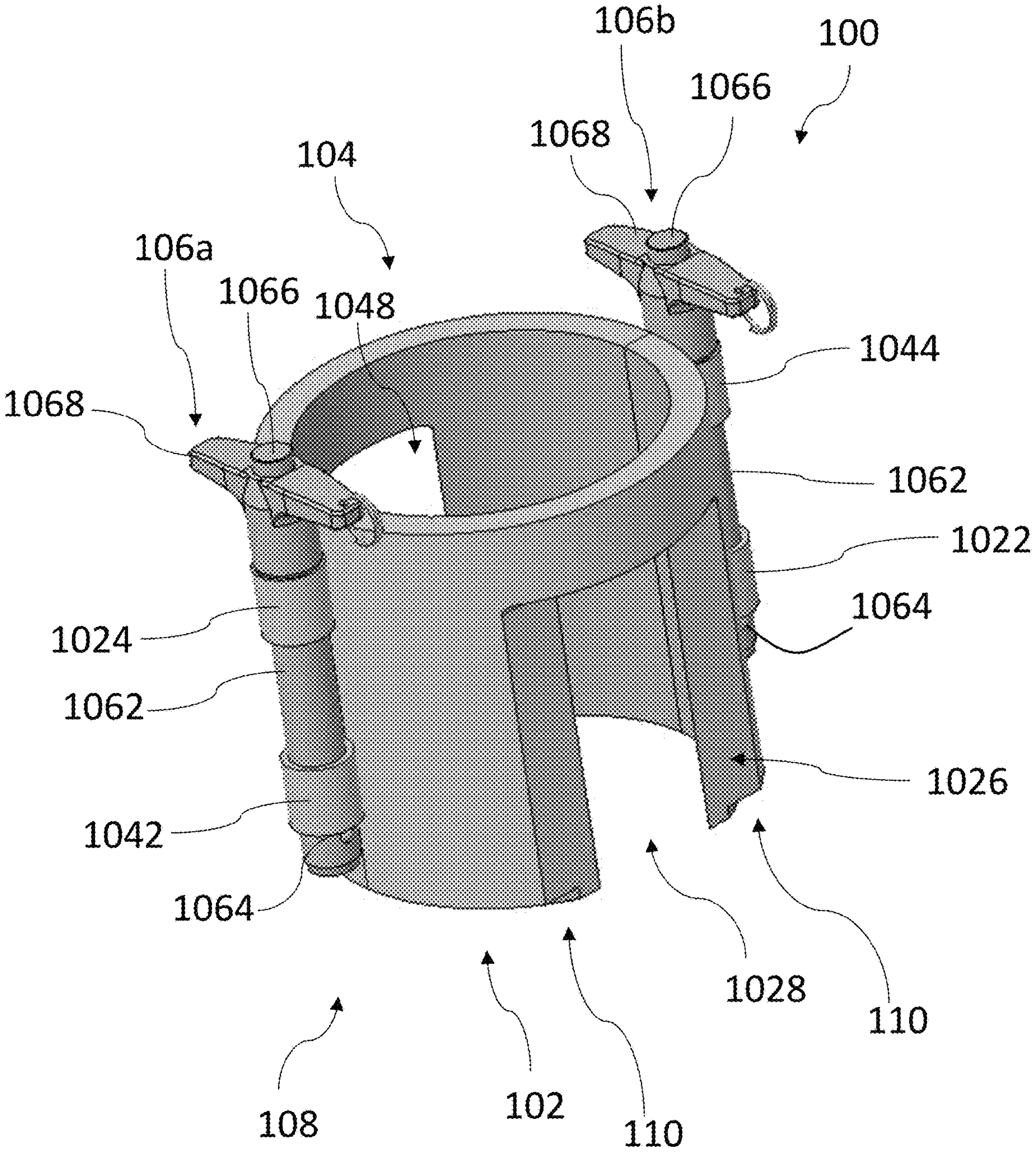
FIG. 4 is an assembled perspective view of the piston ring compression tool of FIG. 3.

For example, as shown in FIG. 4, the body portions 102, 104 of the compression tool 100 are aligned to form a complete tool body 108. Upon alignment, the upper guide 1024 of body portion 102 and the lower guide 1042 of the body portion 104 are aligned to form a common through-bore through which a T-handle 106*a* may be inserted. Similarly, the lower guide 1022 of the body portion 102 and the upper guide 1044 of the body portion 104 are aligned to form another common through-bore through which an additional T-handle 106*b* may be inserted. Upon insertion of the respective T-handles 106 through the respective guides 1022, 1024, 1042, 1044, tension is provided to the compression tool 100 to compress the piston rings of a piston located within the compression tool 100.

Referring to both FIGS. 3 and 4, the T-handle 106 comprises a body 1062, a handle 1068, and a spring-loaded protrusion 1064. When the T-handle 106 is inserted through the respective guides, the spring-loaded protrusion 1064 projects from the body 1062 of the T-handle 106 and secures the T-handle in position within the respective guides. As such, the body portions 102 and 104 of the compression tool 100 are secured together, configured to compress the piston rings of a piston located within the compression tool 100. In some embodiments, the T-handle 106 may further include a button 1066 positioned on the handle 1068. When a user pushes the button 1066, the spring pressure holding the protrusion 1064 in the locked position is released, allowing the protrusion 1064 to recede within the body 1062 of the T-handle 106 and allowing removal of the T-handle 106 from the guides. In other embodiments, the T-handle 106 may not include the button 1066. In such embodiments, the T-handle 106 may be removed by pulling the T-handle 106 in a direction toward the handle 1068 and away from the respective guides.

Figure 5:
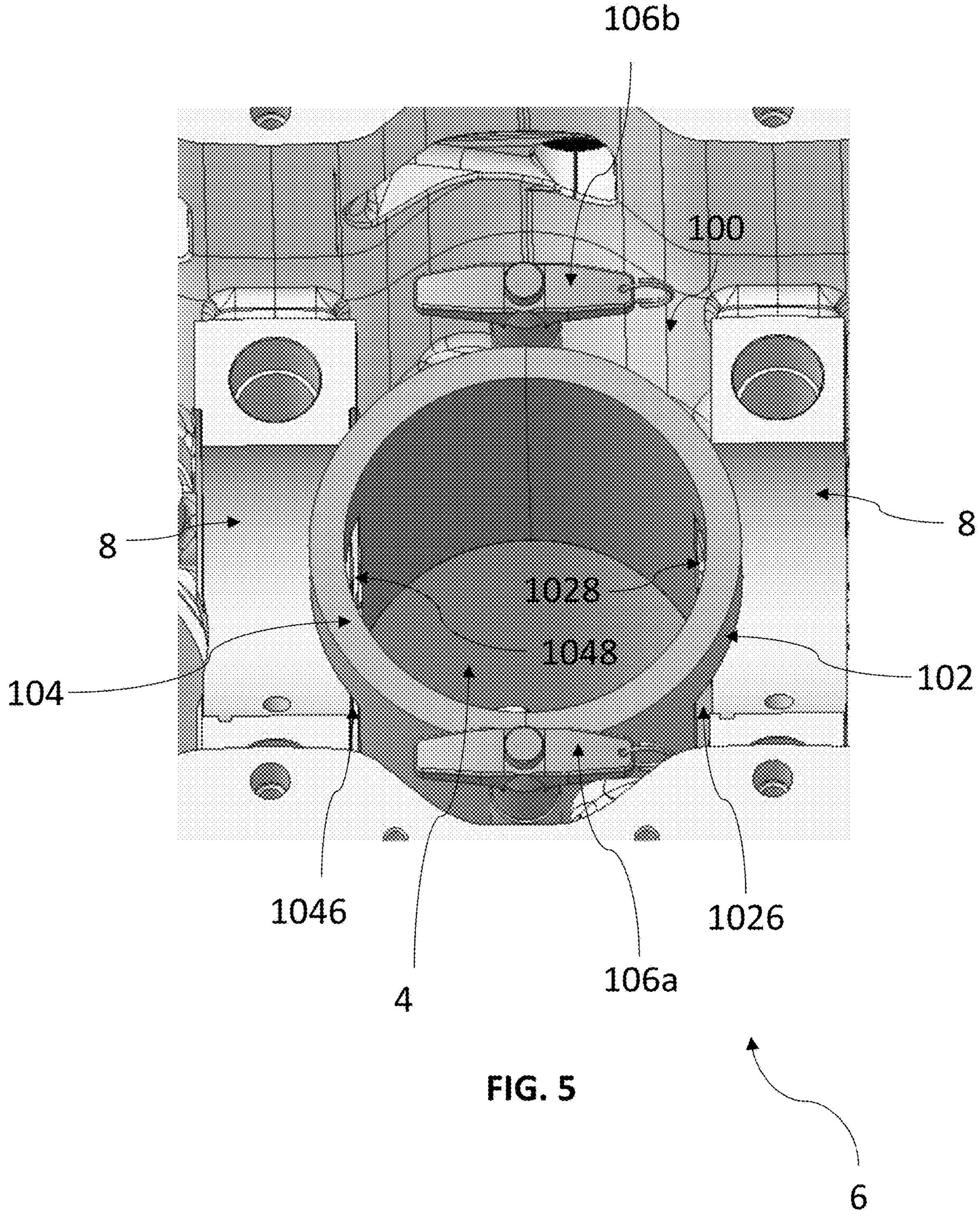
FIG. 5 is the piston ring compression tool of FIG. 4 positioned in a crankcase area of the engine of FIG. 1.

Now referring to FIGS. 3-5, the compression body portions 102, 104 each include a cutout 1026, 1046 (FIG. 5) to facilitate the insertion of the piston and compression tool 100 into the cylinder bore 4 via the crankcase area 6 with consideration to the cylinder block main journal saddles 8. For example, as shown specifically in FIG. 5, the compression tool 100 is inserted into the crankcase area 6 between the cylinder block main journal saddles 8. As is shown, the cutouts 1026, 1046 allow the compression tool 100 to fit between the cylinder block main journal saddles 8 to facilitate more efficient insertion of the piston into the cylinder bore 4. The cutouts 1026, 1046 (FIG. 5) create an opening or window 1028, 1048 in the side of each of the compression body portions 102, 104. The size of the windows 1028, 1048 are in direct relation to the diameter of the piston to be used with the compression tool 100. For example, a compression tool 100 configured for use with a piston having a larger diameter will have a larger window size, while a compression tool 100 configured for use with a piston having a smaller diameter will have a smaller window size. The size of the windows 1028, 1048 is also dependent on the distance horizontally across the respective cutouts 1026, 1046 (FIG. 5). In an illustrative embodiment, the window size is minimized while keeping consideration of the piston size to ensure that the piston rings of the piston positioned within the compression tool 100 engage as much compression area within the compression tool 100 as possible.

Figure 6:
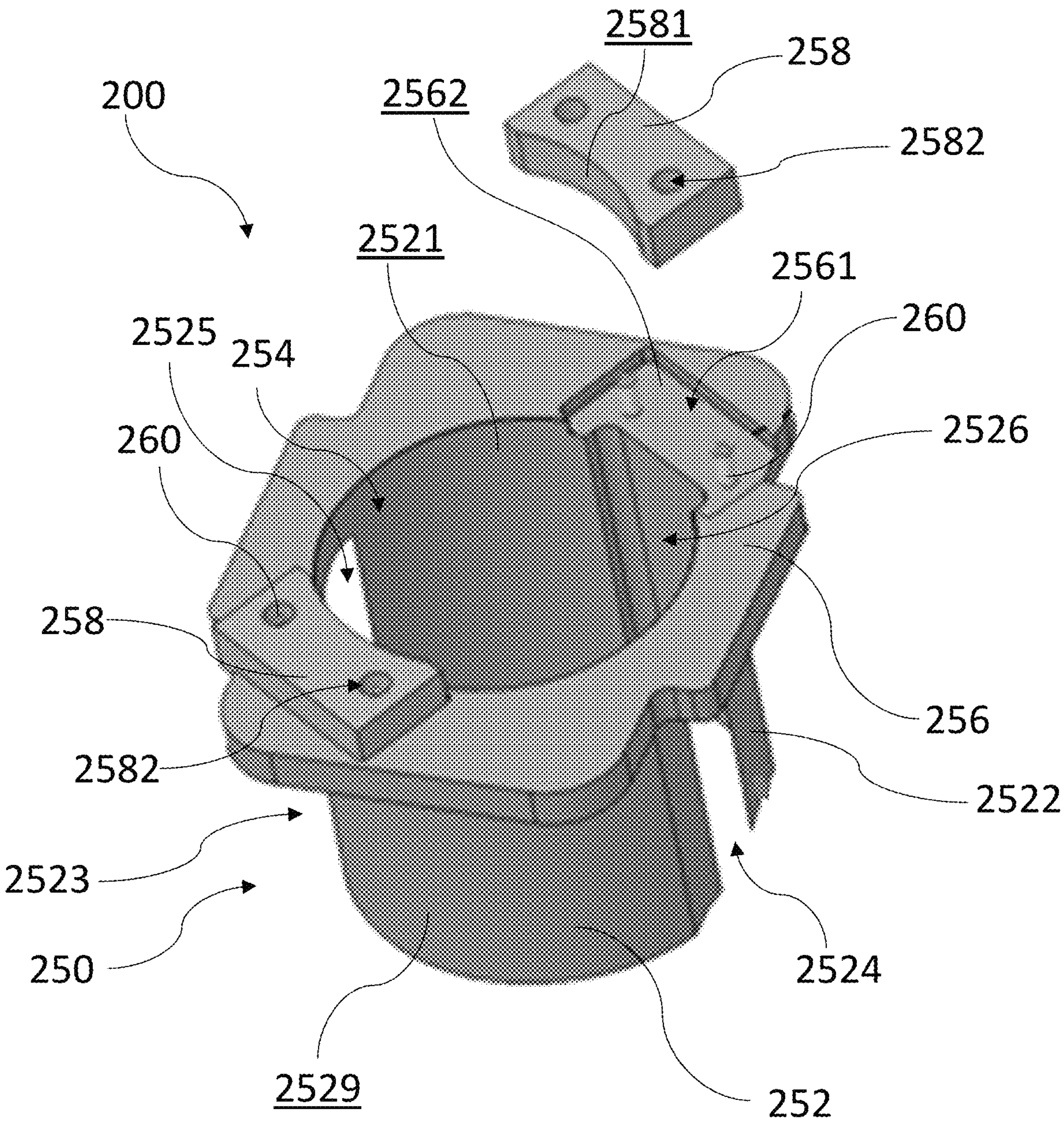
FIG. 6 is a perspective, partially exploded view of a cylinder bore extension tool of the present disclosure, including bumpers.

An exemplary embodiment of a cylinder bore extension tool ("CBET") 200 is illustrated in FIG. 6. The CBET 200 may be comprised of a variety of materials, including, but not limited to, steel, aluminum, and a variety of polymers. The CBET 200 is comprised of a body 250 with a straight sidewall 252 defining an opening 254 through the body 250 and a top portion, or crown 256, on one end of the body 250 surrounding the opening 254 and extending outwardly beyond the sidewall 252. In other embodiments, the sidewall 252 may be tapered. The sidewall 252 has an inner surface 2521 and an outer surface 2529, wherein the inner surface 2521 defines the shape of the opening 254 to match the outer shape of a piston so that the inner surface 2521 of the sidewall 252 fits snugly about the outer surface of a piston assembly.

Referring to FIGS. 6-8B, the crown 256 includes at least two indentations 2561, each indentation 2561 configured to receive a bumper 258. A pair of pins 260 are disposed upon an upper surface 2562 of each indentation 2561 configured to mate with a pair of apertures 2582 defined by each bumper 258. Each bumper 258 further includes at least one arcuate side surface 2581 which faces the opening 254 of the CBET 200. Illustratively, the bumpers 258 are comprised of rubber having a hard durometer, for example, of about 80, with a steel backing plate that is configured to contact the upper surface 2562 of the indentation 2561 upon assembly. During installation, the piston assembly is introduced into the CBET 200 and the cylinder bore 4 (FIG. 1) piston-head-first, requiring the user to control installation through contact with the connecting rod.

The bumpers 258 provide a barrier between the CBET 200 and the connecting rod during installation by stopping the downward momentum of the piston and connecting rod assembly without damaging the tool or the connecting rod. Furthermore, the bumpers 258 are manufactured at a predetermined height that provides positive feedback to the user that the piston rings are installed and captured within the cylinder bore 4 (FIG. 1). In other words, when the connecting rod of the piston assembly makes contact with the bumpers 258, the piston assembly is positioned properly within the cylinder bore 4 (FIG. 1). The predetermined height of the bumper 258 may be calculated by measuring the distance from the top of the CBET 200 to a cross plane on the connecting rod once all of the piston rings are seated in the cylinder bore 4. The bumpers 258 are then sized by their thickness to fill the distance between the upper surface 2562 of the indentation 2561 and the cross plane on the connecting rod. The bumper 258 can easily be exchanged for relatively thicker or relatively thinner versions to allow for changes to connecting rod stroke length and piston ring locations on the piston captured within the cylinder bore 4, wherein the location of the rings are in direct relation to intake and exhaust openings in the cylinder block.

Referring again to FIG. 6, the body 250 of the CBET 200 includes a first cutout 2522 and a second cutout 2523 opposite of the first cutout 2522 to facilitate the insertion of the piston into the cylinder bore 4 (FIG. 1) via the crankcase area 6 (FIG. 1) with consideration to the cylinder block main journals 8 (FIG. 1). Specifically, each of the first cutout 2522 and the second cutout 2523 are positioned in a single plane parallel to the plane of the opposite cutout, while the sidewall 252 defines an arcuate shape between the first cutout 2522 and the second cutout 2523. For example, as shown specifically in FIG. 8B, the CBET 200 is inserted into the crankcase area 6 between the cylinder block main journal saddles 8 so that each of the cutouts 2522, 2523 are in contact with one of the block main journal saddles 8, allowing the CBET 200 to fit between the cylinder block main journal saddles 8 to facilitate more efficient insertion of the piston into the cylinder bore 4. The cutouts 2522, 2523 create a corresponding opening or window 2524, 2525, respectively. Ideally, the size of the window is minimized to ensure as much of the piston ring is compressed as possible.

Figure 7:
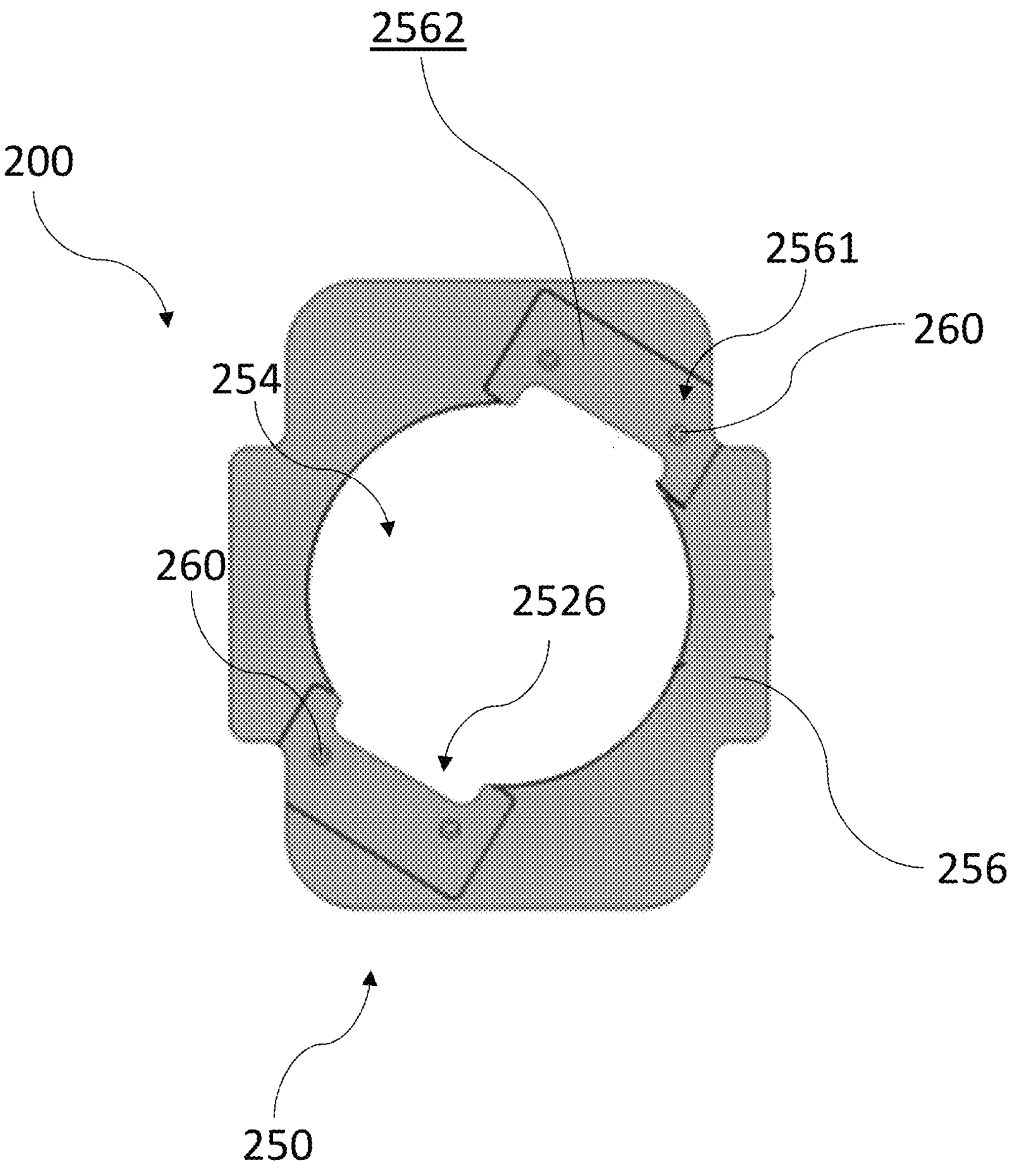
FIG. 7 is a top view of the cylinder bore extension tool of FIG. 6 sans bumpers.
Figure 8A:
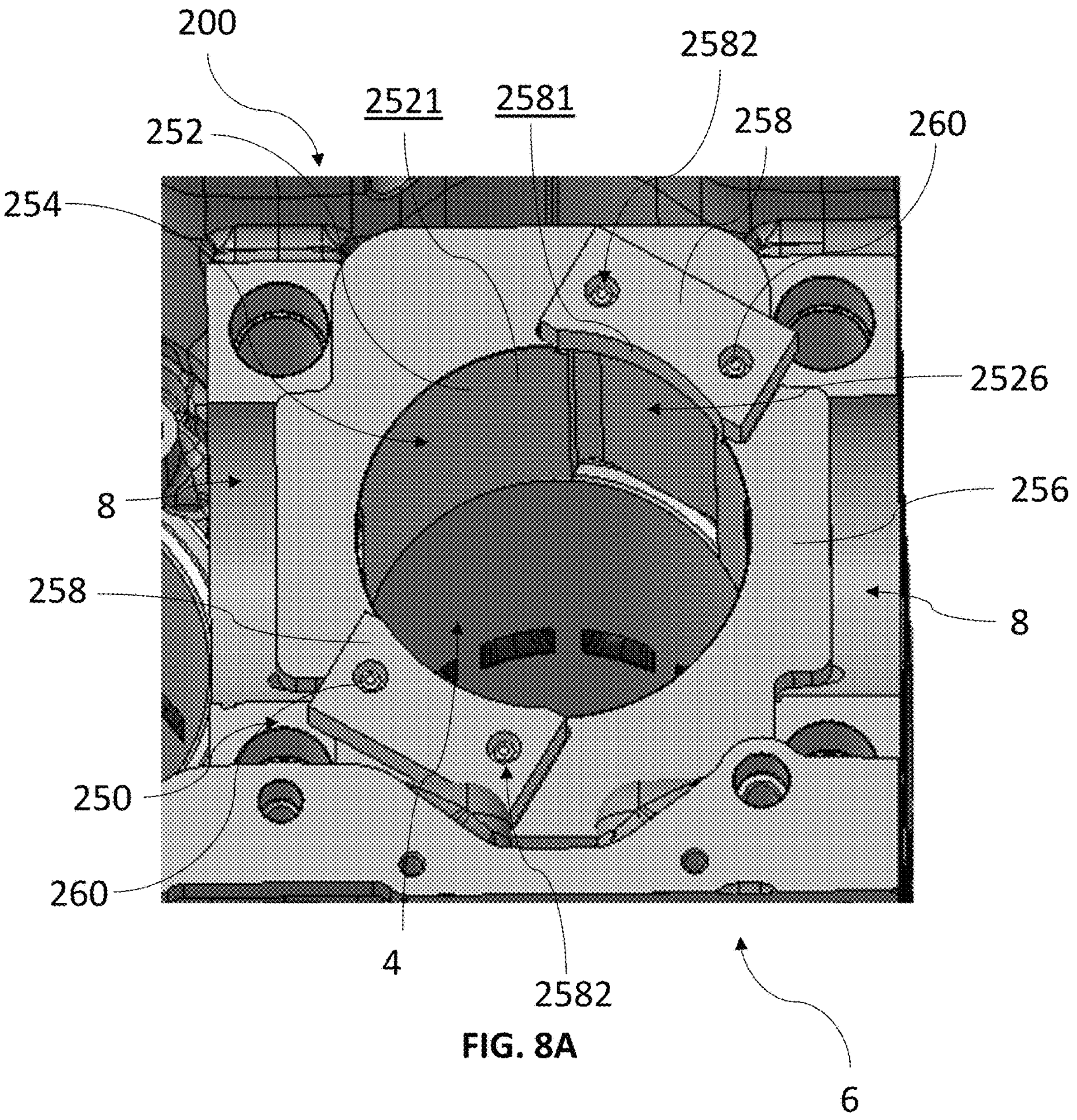
FIG. 8A is a top perspective view of the cylinder bore extension tool of FIG. 6 positioned in a crankcase area of the engine of FIG. 1.
Figure 8B:
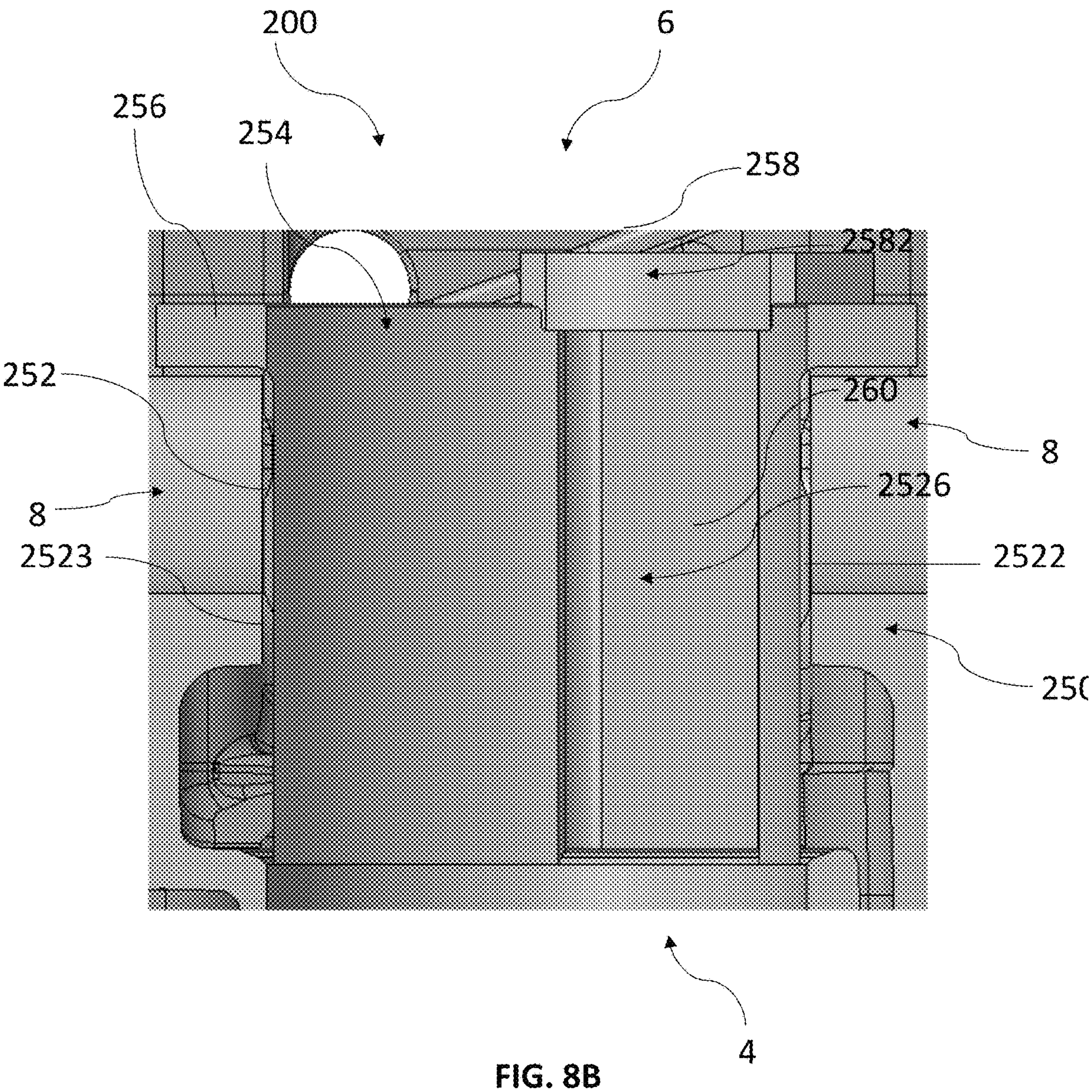
FIG. 8B is a cross-sectional plan view of the cylinder bore extension tool of FIG. 8A.

Referring to FIGS. 6-7, the sidewall 252 further defines channels 2526 along the inner surface 2521 of the sidewall 252, each channel 2526 generally aligned with an indentation 2561 and extending beneath the indentation 2561 longitudinally along the sidewall 252. The bumpers 258 and channels 2526 are sized, shaped, and positioned so that the channels 2526 are only accessible from the crown-end of the CBET 200 when the bumpers 258 have been removed. This allows alignment of the piston assembly and connecting rod so that the piston ring gaps, controlled by staking pins in the piston, are contained within the sidewall 252 of the CBET 200 and do not sit within the windows 2524, 2525. The channels 2526 further provide clearance for the CBET 200 to be removed over the connecting rod once the piston assembly is fully installed within the cylinder bore 4 (FIG. 1) and additionally provides clearance for the insertion of tools as needed.

Figure 9:
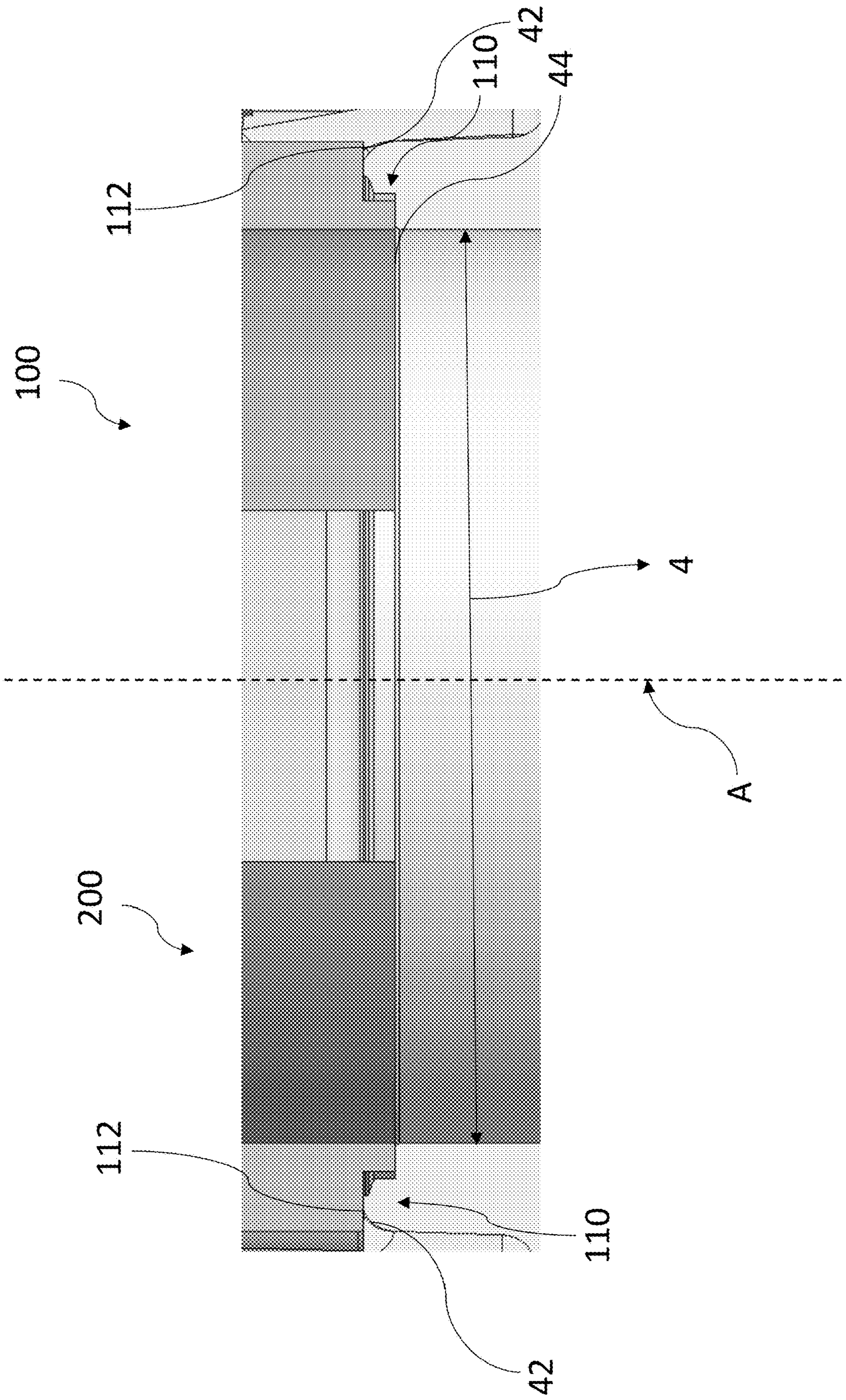
FIG. 9 is a cross-sectional plan view of a piston ring compression tool positioned in the crankcase area of the engine of FIG. 1.

As illustrated specifically in FIG. 9, either of the compression tool 100 or the CBET 200 may further include an alignment cut 110 on the bottom of the compression tool 100 or the CBET 200, or the end of the compression tool 100 or the CBET 200 to be first inserted into the crankcase area 6 (FIG. 1). The shape of the alignment cut 110 is dependent on the shape of the lead-in of the cylinder bore 4. For example, as shown in FIG. 9, the lead in of the cylinder bore 4 includes a lip 42, which supports the bottom surface 112 of the compression tool 100 or the CBET 200 as exposed by the alignment cut 110. By fitting the bottom surface 112 of the compression tool 100 or the CBET 200 on the lip 42, the compression tool 100 or CBET 200 is aligned substantially perpendicular to the axis A of the cylinder bore 4. The alignment cut 110 further ensures the piston assembly is able to align with the cylinder bore 4 co-axially along the axis A. For example, the alignment cut 110 allows the compression tool 100 or CBET 200 to "float," or align with the cylinder bore 4 without encroaching on an opening 44 of the cylinder bore 4 through which the piston must be fitted.

Various modifications and additions can be made to the exemplary embodiments discussed without departing form the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What is claimed is:

1. An apparatus for installing piston rings, the apparatus comprising:
- a self-supporting unitary body consisting of a single-piece of material;
- the body comprising:
  - a sidewall with an inner surface having a continuous cylindrical portion and an outer surface, the sidewall defining an opening through the body;
  - at least one channel defined by the inner surface of the sidewall, the at least one channel extending longitudinally through the inner surface of the sidewall from a first end of the body to a second end of the body; and
  - a top portion surrounding the opening and extending outwardly beyond the sidewall, the top portion defining an indention configured to selectively receive a bumper.

2. The apparatus of claim 1, further comprising a pin disposed on an upper surface of the indention, the pin configured to mate with an aperture defined by the bumper.

3. The apparatus of claim 1, wherein the bumper is at least partially comprised of rubber.

4. The apparatus of claim 1, wherein the bumper at least partially covers the channel when the bumper is received by the indention.

5. The apparatus of claim 1, wherein the channel is aligned with the indentation.

6. The apparatus of claim 1, wherein the channel is configured to receive a portion of a connecting rod.

7. The apparatus of claim 1, the sidewall including a first cutout portion defining a first window and a second cutout portion defining a second window, the first cutout portion and the second cutout portion each defined in a single, parallel plane and the sidewall forming an arcuate shape between the first cutout portion and the second cutout portion.

8. The apparatus of claim 7, wherein the channel is positioned between the first window and the second window.

9. The apparatus of claim 1, further comprising a second channel positioned opposite the first channel.

10. An apparatus for installing piston rings, the apparatus comprising:
- a cylindrical body defining a longitudinal axis and comprising a sidewall, the sidewall having a thickness and defining an opening through the cylindrical body, the cylindrical body including:
- a first planar cutout portion parallel to the longitudinal axis and defining a first window so that the thickness of the sidewall tapers along the first planar cutout portion to the first window; and
- a second planar cutout portion opposite of the first planar cutout portion, the second planar cutout portion parallel to the longitudinal axis and defining a second window so that the thickness of the sidewall tapers along the first planar cutout portion to the second window.

11. The apparatus of claim 10, further comprising a top portion surrounding the opening and extending outwardly beyond the sidewall, the top portion defining an indention configured to selectively receive a bumper.

12. The apparatus of claim 11, further comprising a pin disposed on an upper surface of the indention, the pin configured to mate with an aperture defined by the bumper.

13. The apparatus of claim 11, wherein the bumper is at least partially comprised of rubber.

14. The apparatus of claim 11, wherein the indention is positioned between the first cutout portion and the second cutout portion.

15. The apparatus of claim 11, wherein the indention is a first indention and the apparatus further comprises a second indention positioned opposite of the first indention.

16. The apparatus of claim 10, wherein the apparatus is positioned within a cylinder bore of a cylinder of an engine so that the first planar cutout portion is in contact with a first main journal and the second planar cutout portion is in contact with a second main journal.

* * * * *